US009924176B2

(12) United States Patent
Pomianowski et al.

(10) Patent No.: US 9,924,176 B2
(45) Date of Patent: Mar. 20, 2018

(54) HYBRID BLOCK BASED COMPRESSION

(71) Applicant: ADVANCED MICRO DEVICES, INC., Sunnyvale, CA (US)

(72) Inventors: Andrew S. C. Pomianowski, Sunnyvale, CA (US); Konstantine Iourcha, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 30 days.

(21) Appl. No.: 14/879,616

(22) Filed: Oct. 9, 2015

(65) Prior Publication Data
US 2016/0105677 A1 Apr. 14, 2016

Related U.S. Application Data

(60) Provisional application No. 62/062,211, filed on Oct. 10, 2014.

(51) Int. Cl.
| G06K 9/00 | (2006.01) |
| H04N 19/176 | (2014.01) |
| G06T 1/60 | (2006.01) |
| H04N 19/46 | (2014.01) |
| H04N 19/12 | (2014.01) |

(52) U.S. Cl.
CPC ............. *H04N 19/176* (2014.11); *G06T 1/60* (2013.01); *H04N 19/12* (2014.11); *H04N 19/46* (2014.11)

(58) Field of Classification Search
CPC ...... H04N 19/46; H04N 19/12; H04N 19/176; G06T 7/408; G06T 1/60
See application file for complete search history.

(56) References Cited

U.S. PATENT DOCUMENTS

| 7,171,051 | B1 * | 1/2007 | Moreton ................. G06T 15/04 |
| | | | 382/165 |
| 7,885,469 | B2 | 2/2011 | Wang et al. |
| 8,165,393 | B2 * | 4/2012 | Lu ............................ G06T 9/00 |
| | | | 358/521 |
| 8,285,063 | B2 * | 10/2012 | Akenine-Moller ....... G06T 9/00 |
| | | | 382/239 |
| 9,544,601 | B2 * | 1/2017 | Zhao ...................... H04N 19/46 |
| 9,560,362 | B2 * | 1/2017 | Fu ......................... H04N 19/117 |
| 2007/0201751 | A1 | 8/2007 | Wu et al. |
| 2008/0170795 | A1 | 7/2008 | Akenine-Moller et al. |
| 2012/0251013 | A1 | 10/2012 | Porikli |
| 2013/0094775 | A1 | 4/2013 | Pomianowski et al. |

OTHER PUBLICATIONS

Korean Patent Office; International Search Report and Written Opinion; International Application No. PCT/US2015/054921; dated Jan. 26, 2016.

* cited by examiner

*Primary Examiner* — Yon Couso
(74) *Attorney, Agent, or Firm* — Faegre Baker Daniels LLP

(57) ABSTRACT

A method and apparatus is provided for block based compression of a texture using hardware supported compression formats. The method comprises dividing a texture into a plurality of blocks, for each block, determining a transform for use with the block to minimize an error metric, encoding at least one characteristic of the transform into a plurality of bits otherwise available to represent reference component values, and compressing the block.

16 Claims, 4 Drawing Sheets

HYBRID BLOCK BASED COMPRESSION

CROSS-REFERENCE TO RELATED APPLICATIONS

This application claims priority to U.S. Provisional Patent Application No. 62/062,211 filed Oct. 10, 2014, the entire disclosure of which is hereby explicitly incorporated by reference herein.

FIELD OF THE DISCLOSURE

The disclosure relates generally to a method and apparatus for block based compression of a texture using hardware supported compression formats, and more particularly to a method and apparatus that uses software to permit compression of data that is in some manner incompatible with existing hardware supported compression formats.

BACKGROUND OF THE DISCLOSURE

Computer graphics processing systems process large amounts of data, typically with one or more graphics processing units (GPUs) performing most of the processing. A GPU produces the pixels that make up an image from a higher level description of its components in a process known as rendering. GPUs typically perform continuous rendering by using computing elements to process pixel, texture, and geometric data. The computing elements may execute the functions of rasterizers, setup engines, color blenders, hidden surface removal, and texture mapping. These computing elements are often referred to as shaders, shader processors, shader arrays, shader pipes, shader pipe arrays, shader pipelines, or a shader engine. "Shader" may also refer to an actual hardware component or processor used to execute software instructions (which is more accurately referred to as a "shader program"). A shader processor or program may read and render data and perform any type of processing of the data.

Much of the processing involved in generating complex graphics scenes involves texture data. Textures may be any of various types of data, such height map data, as image data, color or transparency data, roughness/smoothness data, reflectivity data, lookup tables, or other data. Textures may specify many properties, including surface properties like specular reflection or fine surface details in the form of normal or bump maps. Sometimes the term 'texel' is used in the art where a "texel" is a texture element in the same way a 'pixel' is a picture element. However, the terms 'texel' and 'pixel' are frequently used interchangeably (in that a "texel" is sometimes simply referred to as a "pixel"). Accordingly, either term may be used interchangeably within this disclosure.

Providing realistic computer graphics typically requires many high-quality, detailed textures. The use of textures, however, can consume large amounts of storage space and memory-to-GPU bandwidth, and consequently textures are normally compressed to reduce storage space and bandwidth utilization.

Texture compression has thus become a widely accepted feature of graphics hardware in general and 3D graphics hardware in particular. The goal of texture compression is to reduce storage and bandwidth costs on the graphics system while retaining as much of the quality of the original texture as possible. Many texture compression schemes use one of various block-based compression methods for encoding endpoints and interpolated pixel values, as is further described below. The Microsoft® BCn formats used in DirectX are examples of such schemes. It is desirable to develop ways to use these and other formats more flexibly to thereby permit encoding of new types of data (e.g., height map data) other than the data for which the formats were originally designed.

More specifically, new texture compression techniques take a long time to develop and deliver to the market in hardware form. During the transition time from one version of hardware based compression to the next, software developers produce new types of data requiring new compression techniques for which the existing compression schemes provide inadequate results. This creates a gap between the identification of these new techniques and the actual introduction of them to the market.

Accordingly, there exists a need for a method whereby custom data can be encoded using existing compression schemes and varied from block to block (rather than having global application across the entire image), to thereby provide new texture compression possibilities using existing hardware by allowing flexible hybrids of software and hardware based decoding techniques to be developed.

SUMMARY OF EMBODIMENTS OF THE DISCLOSURE

According to one embodiment of the present disclosure, a method is provided for block based compression of a texture using hardware supported compression formats, comprising dividing a texture into a plurality of blocks, for each block, determining a transform for use with the block to minimize an error metric, encoding at least one characteristic of the transform into a plurality of bits otherwise available to represent reference component values, and compressing the block. In one aspect of this embodiment, each block includes data comprising two endpoints in RGB color-space and a plurality of indices representing pixel values on a line between the endpoints, the plurality of bits being upper bits of the endpoints. In a variant of this aspect, the characteristic is encoded into the plurality of bits when the upper bits of each of the endpoints are the same. In another aspect, a number of the plurality of bits used for encoding a first block is different from a number of the plurality of bits used for encoding a second block. In yet another aspect, data associated with the block is not directly supported by the hardware supported compression formats. In still another aspect, the characteristic represents one of a scaling factor and an exponent.

According to another embodiment of the present disclosure, a method is provided for decompressing an image, comprising decoding a plurality of blocks associated with a selected region of the image, for each block, obtaining a characteristic of a transform for use with the block to minimize an error metric, the characteristic being encoded into a plurality of bits otherwise available to represent reference component values, decompressing the block, using the characteristic to obtain the transform to apply to the block, and applying the transform. According to one aspect of this embodiment, each block includes data comprising two endpoints in RGB color-space and a plurality of indices representing pixel values on a line between the endpoints, the plurality of bits being upper bits of the endpoints. In a variant of this aspect, the characteristic is encoded into the plurality of bits when the upper bits of each of the endpoints are the same. In another aspect, a number of the plurality of bits used for encoding the characteristic in a first block is different from a number of the plurality of bits used for encoding the characteristic in a second block.

In still another embodiment of the present disclosure, a system is provided for block based compression of a texture using hardware supported compression formats, comprising a processor configured to support a first compression format, and an encoder. The encoder is configured to, for each block, determining a characteristic of a transform for use with the block to minimize an error metric that results from the block including data not supported by the first compression format, encode the characteristic into a plurality of bits otherwise available to represent reference component values, and compress the block. In one aspect of this embodiment, each block includes data comprising two endpoints in RGB color-space and a plurality of indices representing pixel values on a line between the endpoints, the plurality of bits being upper bits of the endpoints. In a variant of this aspect, the characteristic is encoded into the plurality of bits when the upper bits of each of the endpoints are the same. In another aspect, a number of the plurality of bits used to encode a first block is different from a number of the plurality of bits used to encode a second block. Another aspect further comprises a decoder configured to decompress the compressed block, use the characteristic to obtain the transform to apply to the block, and apply the transform.

Yet another embodiment of the present disclosure provides a non-transitory computer-readable storage medium storing a set of instructions for execution by a computing device to perform block based compression of a texture using a hardware supported compression format, the set of instructions comprising instructions that when executed by the computing device, cause the computing device to divide a texture into a plurality of blocks, for each block, determine a transform for use with the block to minimize an error metric, encode at least one characteristic of the transform into a plurality of bits otherwise available to represent reference component values, and compress the block. In one aspect of this embodiment, each block includes data that comprises two endpoints in RGB color-space and a plurality of indices representing pixel values on a line between the endpoints, the plurality of bits being upper bits of the endpoints. In a variant of this aspect, the characteristic is encoded into the plurality of bits when the upper bits of each of the endpoints are the same. In another aspect, a number of the plurality of bits used to encode a first block is different from a number of the plurality of bits used to encode a second block. Yet another aspect further comprises instructions that when executed by the computing device, cause the computing device to decompress the block, use the characteristic to obtain the transform to apply to the block, and apply the transform.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE EMBODIMENTS

Briefly, in one example, a method and apparatus for block based compression of a texture using hardware supported compression formats is provided. The method comprises dividing a texture into a plurality of blocks, for each block, determining a transform for use with the block to minimize an error metric, encoding at least one characteristic of the transform into a plurality of bits otherwise available to represent reference component values, and compressing the block. Accordingly, the present disclosure provides an approach whereby custom data can be encoded using existing hardware based compression schemes and varied from block to block (rather than having global application across the entire image), to thereby provide new texture compression possibilities using existing the hardware by allowing flexible hybrids of software and hardware based decoding techniques to be developed.

Figure 1:
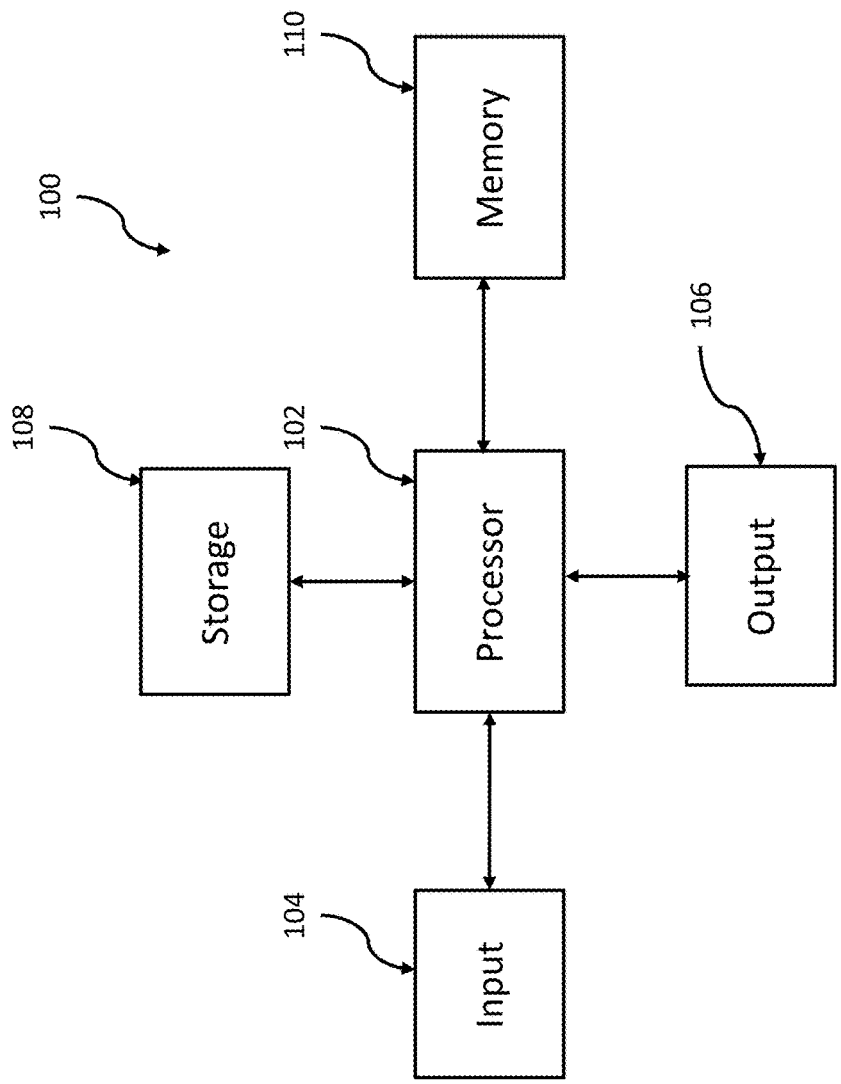
FIG. 1 is a block diagram of an example device in which one or more disclosed embodiments may be implemented.

FIG. 1 is a block diagram of an example device 100 in which one or more disclosed embodiments may be implemented. In certain embodiments, device 100 is a gaming device, a handheld device, a set-top box, a television, a mobile phone, or a tablet or other type of computer. Device 100 generally includes a processor 102, one or more input devices 104, one or more output devices 106, one or more storage devices 108 and one or more memory devices 110.

Processor 102 may include a central processing unit (CPU), a graphics processing unit (GPU), a CPU and GPU located on the same die, or one or more processor cores, wherein each processor core may be a CPU or a GPU. Other types of integrated circuits and processors could also embody aspects of the disclosure including digital signal processors (DSPs), accelerated processing units (APUs), field programmable gate arrays (FPGAs) and the like.

Input 104 may include one or more of a keyboard, a keypad, a touch screen/pad, a detector, a microphone, an accelerometer, a gyroscope, a biometric scanner, or a network connection (e.g., a wireless local area network card for transmission and/or reception of wireless IEEE 802 signals). Output 106 may include one or more of a display, a speaker, a printer, a haptic feedback device, one or more indicators, an antenna, or a network connection (e.g., a wireless local area network card for transmission and/or reception of wireless IEEE 802 signals).

Storage 108 may include a fixed or removable storage component, for example, a hard disk drive, a solid state drive, an optical disk, or a flash drive. Memory 110 may be located on the same die as processor 102, or may be located separately from processor 102. Memory 110 may include a volatile or non-volatile memory, for example, random access memory (RAM), dynamic RAM, or a cache.

Various GPU-supported texture compression formats for devices such as device 100 have been developed over the years, including a set of seven standard formats called BC1 through BC7 (i.e., the Microsoft® BCn formats referenced above). These formats are widely used in, for example, realistic 3D games to reduce memory use (storage and bandwidth) of texture maps. Such applications require high resolution graphics, which require a greater number of textures such as diffuse color, normal map, specular highlight, gloss, emissive glow, and others. To achieve the expected visual detail, vast amounts of data must be provided to processors, which requires very high memory bandwidth. Texture compression reduces the memory bandwidth that would otherwise be required to provide image data to shader cores.

The texture compression enabled by all of the BCn formats is based on block compression, and more specifically, 4×4 blocks of pixels. Each image to be processed is divided into these blocks, which are fixed in size to either 8 or 16 bytes, depending on the format. This standard layout and the contiguous storage of blocks in memory permits efficient GPU rendering as the GPU can quickly locate and access any block containing any part of a texture.

Each block represents a small area of the overall image. In many images, very limited color variation exists within any particular small area (or block). Generally, blocks contain shades of a single color or a gradient between two colors. The BCn formats exploit this fact by separating the definition of the colors in a block from their spatial distribution.

In one embodiment of the present disclosure, compression as described below is performed on a single component height map texture using, for example, the Microsoft® BC5 specification. In such an embodiment, compression of height map texture using BC5 requires a transform which transforms two-component texture into one component texture during decompression (and a corresponding inverse transform during compression) as the height map is a single component texture. In this case, the data being compressed and the hardware supported format may have a different number of components (channels) by applying the principles of the present disclosure. This approach exploits the fact that height map texture does not use the full dynamic range of 16 bits by propagating control bits (i.e., at least one characteristic of a transform) using upper bits from one channel (e.g., the red channel). The encoded characteristic(s) permit the encoder to obtain the transform to use for the block that will provided minimized error.

By way of example, assuming the two-component outputs of a BC5 decoder are C1 and C2 (i.e., the two unsigned channels in 8.6 format), the following instructions may be implemented according to the principles of the present disclosure (lines are numbered for reference below):

```
float transform (float C1, float C2) {                          (1)
static int mask1 = (1<<7);                                       (2)
static int mask2 = (1<<6);                                       (3)
static int scale1 = 4;                                           (4)
static int scale2 = 8;                                           (5)
static int scale3 = 32;                                          (6)
static int bias1 = 64;                                           (7)
static int bias2 = 32;                                           (8)
static int bias3 = 32;                                           (9)
if ((int)C2 & mask1 == 0) {                                     (10)
    return                                                       (11)
        C1 * 256 + (C2 - bias1) * scale1                         (12)
else if ((int)C2 & mask2 == 0) {                                (13)
    return                                                       (14)
        C1 * 256 + (C2 - mask1 - bias2) * scale2                 (15)
else {                                                          (16)
    return                                                       (17)
        C1 * 256 + (C2 - (mask1 + mask2) - bias3) * scale3       (18)
}                                                               (19)
}                                                               (20)
```

Lines (2) and (3) provide masks to decode the transform parameter. In this example, these are bits of C2 which provide the code of the parameter to be implemented (i.e., bits 7 and 6 may include parameter code information). Lines (4) through (9) provide example definitions of three scales for each transform and three biases for each transform. Lines (10) through (20) provide instructions for decoding the transforms (i.e., determining the code of the transform to be applied). In this embodiment, the code is variable length. If bit 7 is 0, then transform 1 (whatever that may be) should be applied. This is reflected at line (12). As this implementation only uses 1 bit of C2 (in this example, the most significant bit—MSB—of C2) to encode the code of the transform, the other seven bits are available for conveying other information. In the case of MSB=0, then there is no need to mask it out. Normally, after decoding the code, the bit is masked out, but that is not necessary where the bit is already zero. If MSB=1, then the instructions evaluate the next bit. This is reflected at lines (13) and (14). If the second bit is zero, then the second transform is to be applied (see lines (15) and (16)). Finally, if both bits are 1, then the third transform is to be used and both bits are masked (see line (18).

The pixels or texels of each block are coded as indices into the color palette of the block, which is typically very limited as described above. Only a few bits per pixel are required because the palette is so small. The palette is compressed by assuming that all its colors fall at evenly spaced points along a line segment (or interpolation axis) in RGB color space extending between two endpoints. Using this assumption, only the endpoints of the line need to be stored, and the other colors are reconstructed by blending the two endpoints in different proportions.

Figure 2:
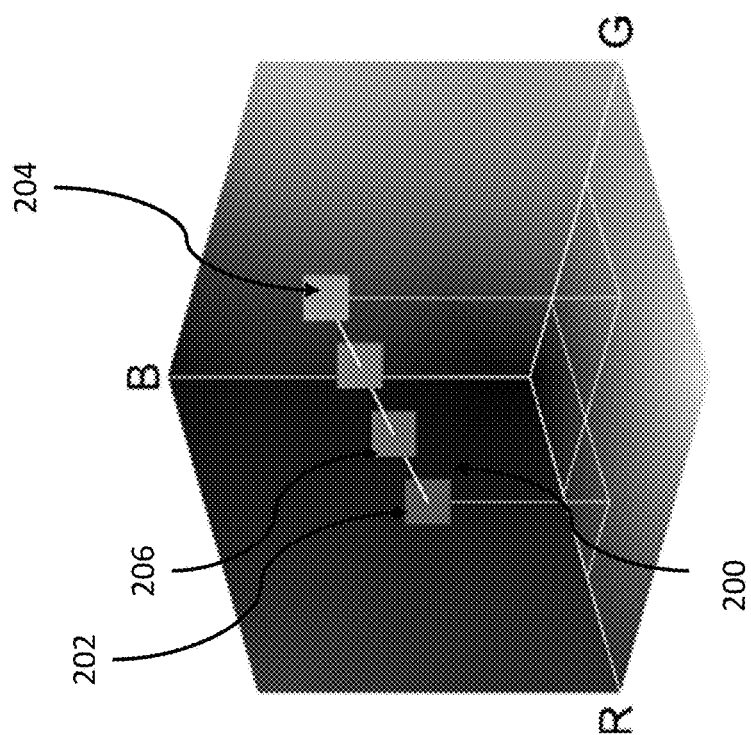
FIG. 2 is a conceptual diagram of a block of data represented as a line in RGB color space.

FIG. 2 provides a conceptual diagram of the line segment 200 described above in RGB color space. While this example is illustrative, it should be noted one embodiment of the present disclosure uses one component (scalar) input data compression using a two component format supported by hardware using, for example, the Microsoft® BC5 specification. As shown, the RGB color space includes a unit cube subset of the 3D Cartesian coordinate system to map out the primary colors (red, green and blue) with R, G and B axes and with black (no light) at the origin. Thus, as the model is a unit cube, the axes each have an intensity range between 0 and 1. Line 200 includes endpoint 202 and endpoint 204. Line 200 further includes, in this example, two intermediate points or pixel values 206 that are equally spaced along line 200 through linear interpolation. Depending upon the implementation, and as is understood by those skilled in the art, the number of pixel values 206 may be greater than or less than two. The pixel values 206 are included in the block corresponding to line 200 as data in the form of a three-bit index. It should be understood that an index for each pixel value of more or less than 3 bits may be used in accordance with the present disclosure.

According to the present disclosure, it is recognized that by sacrificing some bits of precision from the endpoints 202, 204 it is possible to encode additional data on a per-block basis, which permits special treatment by the decoder of custom data or data that the existing hardware compression scheme was not designed to accommodate. For purposes of example only, assume a single component format that encodes a channel of data (the "red" channel) with endpoints 202, 204 specified by 8-bit values and pixel values 206 selected using a 3-bit index. The possible colors for any pixel in the block is derived as follows:

```
red_0 = endpoint_0;
red_1 = endpoint_1;
red_2 = (6*red_0 + 1*red_1)/7.0f; // bit code 010
red_3 = (5*red_0 + 2*red_1)/7.0f; // bit code 011
red_4 = (4*red_0 + 3*red_1)/7.0f; // bit code 100
red_5 = (3*red_0 + 4*red_1)/7.0f; // bit code 101
```

```
red_6 = (2*red_0 + 5*red_1)/7.0f; // bit code 110
red_7 = (1*red_0 + 6*red_1)/7.0f; // bit code 111
```

The 3-bit index is used to select, for each pixel in the block, which color to use. The final values returned fall within the range of 0 to 1.

As pixel values 206 are obtained through linear interpolation, if the top bits of each endpoint 202, 204 are the same, then the top bits of the pixel values 206 will be constant for the block. Additionally, if the upper bits of each of endpoints 202, 204 are the same, then the values in these upper bits do not affect the interpolated values in any of the lower bits of data. Consequently, some number of upper bits (e.g., 3 bits from each of endpoint 0 and endpoint 1) may be reserved for special treatment by the decoder. It should be understood that the number of reserved bits may vary from block to block. Stated another way, these bits may be used to encode special data for the block.

After retrieval of any color value from the texture, the following software decoding step may be added after the hardware decoding described above.

```
color = returned_color_from_hardware_decoder; // range (0->1.0)
color = 255.0; // expand the color to match the original endpoint precision
reservedBitmask = 0xe0; // Binary mask 11100000
intColor = (int)olor; // get rid of the fractional bits
specialBlockData = (intColor & reservedBitmask) >> 5; // Extract special block bits
color = (float)intColor − (specialBlockData <<5)
color /= 31.0; // rescale the remaining data back into the 0->1 range
```

Such a software decoding step communicates the 3 bits of data (which are sufficient to provide 8 different modifications to the encoding) to the shader. In one embodiment of the present disclosure, the bits of data may be used to transform the decoded data such as by representing a scaling factor or an exponent to be applied to the data. As should be apparent to one skilled in the art, many other uses of the bits of data may be made. It should also be understood that the method described above may readily be modified by a skilled person for use in multi-component compressed formats (i.e., bits can be encoded in any of the independent components in the same way as described above).

In the manner described above, custom data may be transformed to provide better results from the existing compression scheme (which was not designed to process the custom data). The data is transformed upon compression, and must be transformed back to its original state after compression (i.e., upon decompression and rendering). It should also be understood that the transformation may be different for different blocks. In this manner, error reduction and quality improvement may be realized through use of various techniques determined to be most suitable on a block-by-block basis. To permit such block-by-block transformation, a transform must be passed to a software decoder for each block. For each block in an image, for example, a transform is identified for use with the block to minimize an error metric. Further details on methods for determining a transform to use with each block are provided in co-pending U.S. patent application Ser. No. 13/651,020, filed on Oct. 12, 2012 and entitled "REGION-BASED IMAGE COMPRESSION," the entire disclosure of which being hereby expressly incorporated herein by reference. In one embodiment of the present disclosure, the transform is passed to the decoder by including the transform in the upper bits of the endpoints described above. When the decoder receives the encoded pixels of the block, the parameter is provided in the MSB of the pixel. As described herein, the present transforms include combining two components from the hardware decompression of the two component format (BC5) into one component. Correspondingly, the compressor transforms single component data into two component data.

Figure 3:
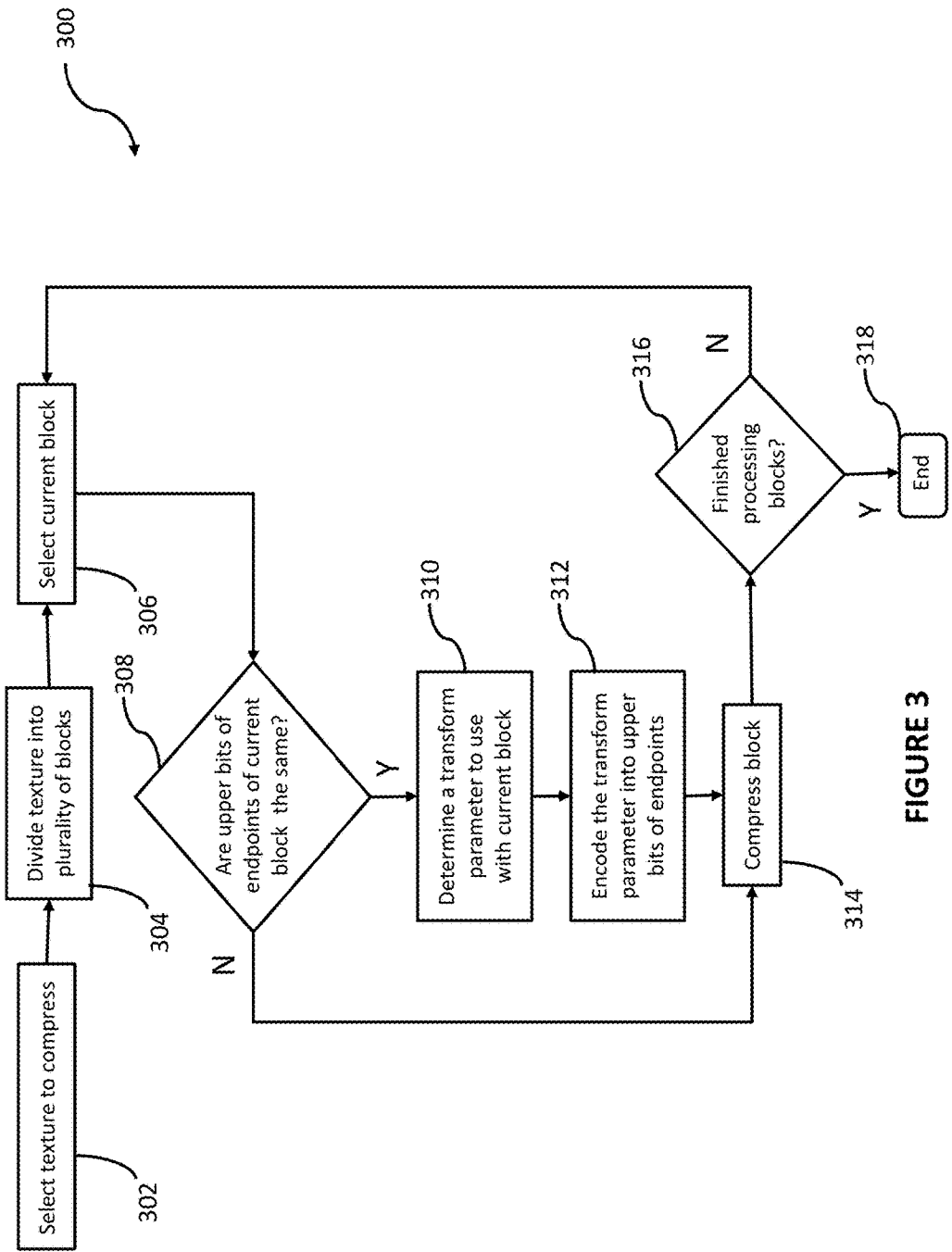
FIG. 3 is a flow chart of a method for compressing a texture according to the present disclosure.

FIG. 3 provides a flow chart for a method 300 of compressing a texture according to the principles of the present disclosure. As shown, at block 302 a texture to compress is selected. At block 304, the texture is divided into a plurality of blocks (such as the 4×4 blocks described above). At block 306, a current block is selected for compression. Next, at block 308 it is determined whether the upper bits of endpoints 202, 204 of the current block are the same, thereby permitting such endpoints to be replaced with a transform as described herein. If the upper bits are the same, then at block 310 a transform is determined for use with the current block. If not, then at block 309 the data is rounded or otherwise transformed to "make space" for bits to use in the encoded block. It should be noted that at block 310, it may be determined that a transform is not necessary and one or more bits may be used to indicate that the rest do not need a transform. It should also be understood that variable length codes may be used in certain embodiments to encode transforms so that the number of "transform bits" is different from block to block (while at least one bit is always used for encoding).

When the upper bits of endpoints 202, 204 of the current block are the same and a transform parameter is determined at block 310, at block 312 the transform is encoded into the upper bits of endpoints 202, 204 according to principles known in the art. Then, at block 314 the current block is compressed. Next, at block 316, it is determined whether all blocks are processed. If all blocks have been processed, then the process ends at block 318. If not, then a new current block is selected at block 306 and the remainder of the method is repeated.

Figure 4:
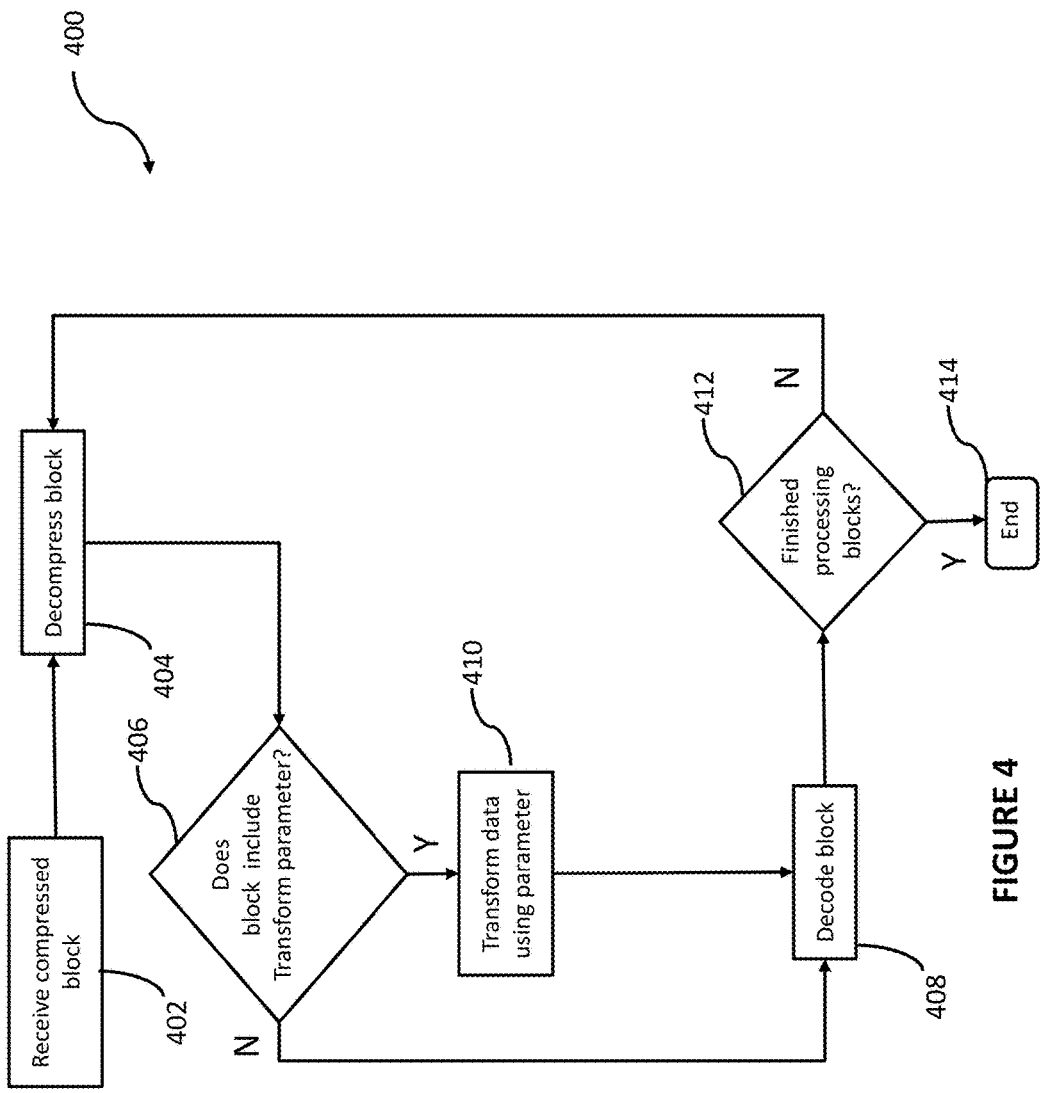
FIG. 4 is a flow chart of a method for decompressing a texture according to the present disclosure.

FIG. 4 provides a flow chart for a method 400 of decompressing a texture according to the principles of the present disclosure. As shown, at block 402 a block compressed according to method 300 of FIG. 3 is received. At block 404, the block is decompressed. At block 406, it is determined whether the decompressed block includes a transform. If not, then the block is decoded at block 408. If the decompressed block includes a transform as determined at block 406, then at block 410 the transform is used to transform the data corresponding to the block. Then, at block 408 the block is decoded.

At block 412 it is determined whether all compressed blocks have been processed. If so, then the process ends at block 414. If not, then the next block for processing is decompressed at block 404 and the above-described process is repeated. It should be understood that in this description, the term "transform" is used in a very general sense and connoting any data processing.

In the above-described manner, fine-grained modifications may be made to the compression method employed for each block to permit implementation of more complicated compression techniques. Thus, among other advantages, the method and apparatus of the present disclosure facilitates wide-ranging potential applications for enabling more complicated compression schemes to be used within a reasonably short time on existing graphics hardware that was not designed to support the more complicated compression schemes. In this manner, new types of data (or custom data), such as height map data or other data without a presently available hardware compression scheme, may be processed using existing hardware. Other advantages will be apparent to those skilled in the art.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A method for block based compression of a texture using hardware supported compression formats, comprising:
    dividing a texture into a plurality of blocks, wherein each block includes data comprising two endpoints wherein the two endpoints are in RGB color-space and the data comprises a plurality of indices representing pixel values on a line between the endpoints, the plurality of bits being upper its of the endpoints;
    for each block, determining a transform for use with the block to minimize an error metric;
    encoding at least one characteristic of the transform into a plurality of bits otherwise available to represent reference component values when upper bits of each of the endpoints are the same; and
    compressing the block.

2. The method of claim 1, wherein a number of the plurality of bits used for encoding a first block is different from a number of the plurality of bits used for encoding a second block.

3. The method of claim 1, wherein data associated with the block is not directly supported by the hardware supported compression formats.

4. The method of claim 1, wherein the characteristic represents one of a scaling factor and an exponent.

5. A method for decompressing an image, comprising:
    decoding a plurality of blocks associated with a selected region of the image wherein each block includes data comprising two endpoints wherein the two endpoints are in RGB color-space and the data comprises a plurality of indices representing pixel values on a line between the endpoints, the plurality of being upper bits of the endpoints;
    each block, obtaining a characteristic of a transform for use with the block to minimize an error metric, the characteristic being encoded into a plurality of bits otherwise available to represent reference component values when upper bits of each of the endpoints are the same;
    decompressing the block;
    using the characteristic to obtain the transform to apply to the block; and
    applying the transform.

6. The method of claim 5, wherein a number of the plurality of bits used for encoding the characteristic in a first block is different from a number of the plurality of bits used for encoding the characteristic in a second block.

7. A system for block based compression of a texture using hardware supported compression formats, comprising:
    a processor configured to support a first compression format; and
    an encoder configured to:
        for each block, determining a characteristic of a transform for use with the block to minimize an error metric that results from the block including data not supported by the first compression format, wherein each block includes data comprising two endpoints wherein the two endpoints are in RGB color-space and the data comprises a plurality of indices representing pixel values on a line between the endpoints, the plurality of hits being upper bits of the endpoints;
        encode the characteristic into a plurality of bits otherwise available to represent reference component values when upper bits of each of the endpoints are the same; and
        compress the block.

8. The system of claim 7, wherein a number of the plurality of bits used to encode a first block is different from a number of the plurality of bits used to encode a second block.

9. The system of claim 7, further comprising:
    a decoder configured to:
    decompress the compressed block;
    use the characteristic to obtain the transform to apply to the block; and
    apply the transform.

10. A non-transitory computer-readable storage medium storing a set of instructions for execution by a computing device to perform block based compression of a texture using a hardware supported compression format, the set of instructions comprising instructions that when executed by the computing device, cause the computing device to:
    divide a texture into a plurality of blocks wherein each block includes data that comprises two endpoints wherein the two endpoints are in RGB color-space and the data comprises a plurality of indices representing pixel values on a line between the endpoints, the plurality of bits being of the endpoints;
    for each block, determine a transform for use with the block to minimize an error metric;
    encode at least one characteristic of the transform into a plurality of bits otherwise available to represent reference component values when the upper bits of each of the endpoints are the same; and
    compress the block.

11. The non-transitory computer-readable storage medium of claim 10, wherein a number of the plurality of bits used to encode a first block is different from a number of the plurality of bits used to encode a second block.

12. The non-transitory computer-readable storage medium of claim 10, further comprising instructions that when executed by the computing device, cause the computing device to:
    decompress the block;
    use the characteristic to obtain the transform to apply to the block; and
    apply the transform.

13. A method for block based compression of a texture using hardware supported compression formats, comprising:
    dividing a texture into a plurality of blocks;
    for each block, determining a transform for use with the block to minimize an error metric;
    encoding at least one characteristic of the transform into a plurality of bits otherwise available to represent reference component values; and
    compressing the block, wherein a number of the plurality of bits used for encoding a first block is different from a number of the plurality of bits used for encoding a second block.

14. A method for decompressing an image, comprising:
    decoding a plurality of blocks associated with a selected region of the image;
    for each block, obtaining a characteristic of a transform for use with the block to minimize an error metric, the characteristic being encoded into a plurality of bits otherwise available to represent reference component values;
decompressing the block;
using the characteristic to obtain the transform to apply to the block; and
applying the transform, wherein a number of the plurality of bits used for encoding the characteristic in a first block is different from a number of the plurality of bits used for encoding the characteristic in a second block.

15. A system for block based compression of a texture using hardware supported compression formats, comprising:
a processor configured to support a first compression format; and
an encoder configured to:
for each block, determining a characteristic of a transform for use with the block to minimize an error metric that results from the block including data not supported by the first compression format;
encode the characteristic into a plurality of bits otherwise available to represent reference component values; and
compress the block, wherein a number of the plurality of bits used to encode a first block is different from a number of the plurality of bits used to encode a second block.

16. A non-transitory computer-readable storage medium storing a set of instructions for execution by a computing device to perform block based compression of a texture using a hardware supported compression format, the set of instructions comprising instructions that when executed by the computing device, cause the computing device to:
divide a texture into a plurality of blocks;
for each block, determine a transform for use with the block to minimize an error metric;
encode at least one characteristic of the transform into a plurality of bits otherwise available to represent reference component values; and
compress the block, wherein a number of the plurality of bits used to encode a first block is different from a number of the plurality of bits used to encode a second block.

* * * * *